Aug. 1, 1967  L. TRIPLETT  3,333,873
STRUCTURAL ADHERING CONSTRUCTION
Filed Dec. 27, 1965  2 Sheets-Sheet 1
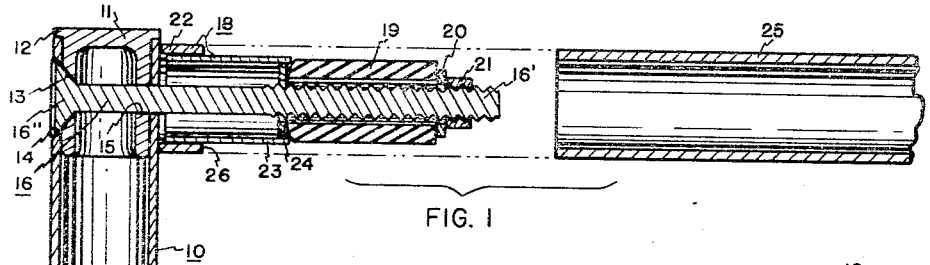
FIG. 1
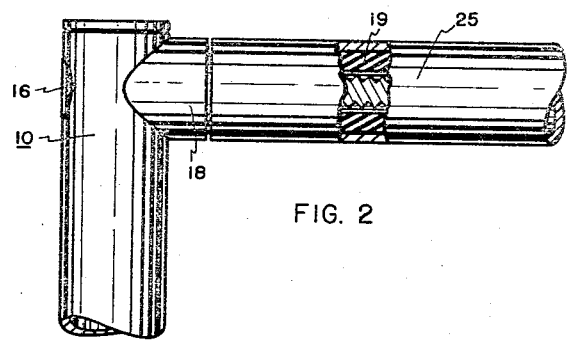
FIG. 2
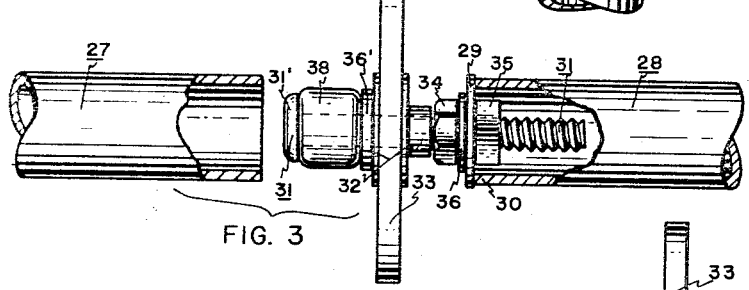
FIG. 6
FIG. 3
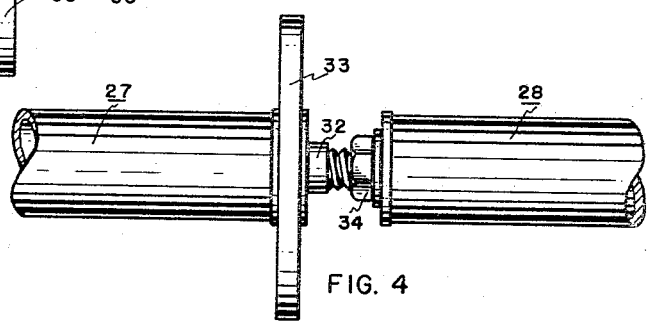
FIG. 4
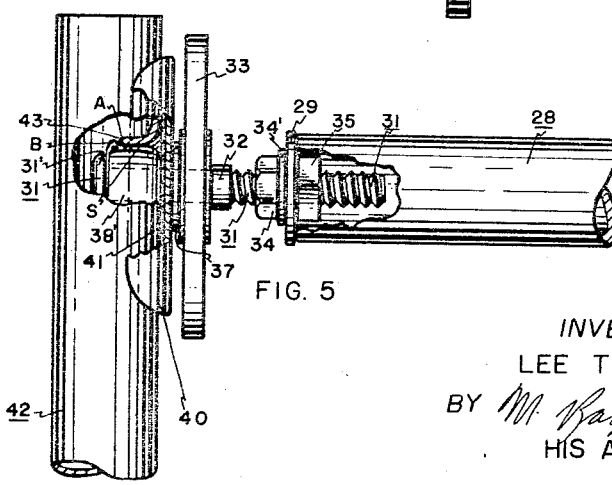
FIG. 5
INVENTOR.
LEE TRIPLETT
BY *M. Ralph Shaffer*
HIS ATTORNEY Aug. 1, 1967   L. TRIPLETT   3,333,873
STRUCTURAL ADHERING CONSTRUCTION
Filed Dec. 27, 1965   2 Sheets-Sheet 2

INVENTOR
LEE TRIPLETT
BY *M. Ralph Shaffer*
HIS ATTORNEY

United States Patent Office 3,333,873
Patented Aug. 1, 1967

3,333,873
STRUCTURAL ADHERING CONSTRUCTION
Lee Triplett, Magna, Utah, assignor of one-third to
Carl D. Clark and one-third to John W. Finnegan
Filed Dec. 27, 1965, Ser. No. 517,524
2 Claims. (Cl. 287—2)

This application is a continuation-in-part of application S.N. 451,116, filed Apr. 27, 1965, and now abandoned.

The present invention relates to structural adhering constructions and, more particularly, to a new and improved compression means for releasably or permanently securing tubular, flat, block, or other constructions together.

Accordingly, a principle of the object of the present invention is to provide improved means for joining tubular elements together.

A further object is to provide tubular constructions of unique character which are easily assembled and disassembled.

A further object is to provide improved structure for releasably securing tubular elements in end-to-end, axial alignment.

An additional object is to provide means for securing tubular elements at right angles to each other, and this whether that portion of the structuer so connected is in a T-configuration or an L-configuration.

An additional object is to provide a releasably-attachable tubular construction which makes use of means for tightening and loosening frictional engagement of compression-sensitive, expandable elements for retaining tubular elements together in desired positions.

A further object is to provide a structural means for releasably securing together two members, whether of similar or diverse character, in a rigid construction.

An additional object is to provide, through the principle of compressing a resilient sleeve, constructions which are ideal for securing signs to singposts, planter boxes to masonry walls, rails to railroad ties, and all manner of structures to and within blind holes in support structural elements.

An additional object is to provide an improved anchoring means whereby the same can be easily installed and pre-loaded upon a member to be secured to a support structure and, additionally, which can be easily installed in situ, i.e., at the place where the support structure is present.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a fragmentary, sectioned, exploded view of L-configured structure incorporating the principles of the present invention.

FIGURE 2 is a side elevation of the structure of FIGURE 1 where the tubular elements thereof are joined together and secured in a manner as hereinafter described.

FIGURE 3 is a fragmentary, exploded, side-elevation of structure representing a second embodiment of the invention wherein tubular elements are joined end-to-end; that is, coaxially together.

FIGURE 4 is a side elevation of the structure in FIGURE 3 which has been assembled and fixed in mutual disposition.

FIGURE 5 is a fragmentary, side elevation similar to the structure of FIGURES 1 and 2, but which indicates that there may be joined together in a T-configuration certain tubular elements, this with the aid of the present invention.

FIGURE 6 is a fragmentary section of an alternate construction which can be used in stud or bolt securement to the horizontal tubular element shown.

Figure 7:
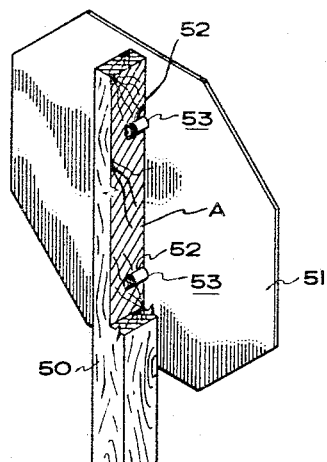
FIGURE 7 is a fragmentary perspective view of a signpost incorporating the principles of the present invention.

In the embodiment of the invention shown in FIGURES 1 and 2 the tubular member 10 is shown to include an end plug 11 having a peripheral lip 12 and a countersunk aperture 13. This aperture will register with the countersunk wall aperture 14 of the tubular member 10. Diametrically opposite aperture 14 will be apertures 15, allowing for the admittance there-through of adjustment bolt 16. It will be seen in FIGURE 1 that the adjustment bolt 16 has a threaded shank 16' which is disposed through adapter boss 18, compression-expandable resilient sleeve 19, washer 20, and nut 21. Nut 21, of course, is conventional and threads upon the threaded shank 16' of bolt 16. Washer 20 is a bearing washer disposed between nut 21 and the outer extremity of sleeve 19. Sleeve 19, itself, is preferably made of rubber, Neoprene, or other suitable material which expands under compression and which preferably assumes its normal shape (as shown), when compression is released. Adapter boss 18 includes an adapter member 22, configured to receive the exterior periphery of tubular member 10, and an extension sleeve member 23. Extension sleeve member may be sweated into, pressed into, soldered, or otherwise affixed to adapter member 22. Sleeve member 23 is provided with a bearing end 24 which may take the form of a bearing washer, welded, soldered, or otherwise affixed to the outermost extremity of member 23. It is seen, therefore, that the bearing end or washer 24 is fixedly spaced from tubular member 10, and, additionally, bears upon the near end of resilient sleeve 19. Tubular member 25 is exploded outwardly from the construction shown in the left-hand portion of FIGURE 1 to indicate the manner in which the tubular member is released, and, alternately, mounted onto adapter boss 18 at extension sleeve member 23. The bolt 16 may have an Allen-wrench receiving head, a screwdriver-receiving contoured head as shown, or any other type of head which is suitable for rotation. Preferably, prior to securing tubular member 25 to the structure associated with tubular member 10, it will be desirous to preload the resilient sleeve 19 by turning for a few turns the bolt 16. Thereafter, tubular member 25 will be slipped over the structure indicated to seat against the shoulder 26 formed by sleeve member 23 and adapter member 22. At this juncture the user will revolve the bolt 16 about its own axis so as to draw the nut 21 forwardly, i.e., toward bolt head 16' and thereby compress sleeve 19. The same causes the sleeve to be deformed, i.e., enlarged, outwardly so as to frictionally engage in a retentive manner the tubular member 25. This secures tubular member 25 in place as shown in FIGURE 2.

When it is desirous to release tubular member 25 from the structure shown in the left-hand portion of FIGURE 1, then the bolt will be rotated in the opposite direction so as to displace nut 21 from bearing washer 24 and hence allow the resilient sleeve to assume its previous condition. At this point the frictional co-action between sleeve 19 and the inner wall of tubular member 25 is reduced so as to allow the tubular member 25 to be slipped off the resilient sleeve 19.

FIGURES 3 and 4 illustrate yet another embodiment of the invention. Tubular member 27 and tubular member 28 are indicated in FIGURES 3 and 4. Tubular member 28 includes a washer-configured end plate 29 which is soldered, welded or otherwise affixed to the end extremity 30 of tubular member 28. Bolt 31 threads through the metal grommet 32 construction (which may be employed), which is affixed and keyed to adjustment wheel 33. Bolt 31 is also threaded through nut 34 and nut 35. Washers 36 and 36' are also provided. Nuts 34 and 35 may comprise lock nuts, permanently anchoring the bolt 31 in a predetermined extended position relative to tubular member 28. Various constructions may be had relative to adjustable wheel 33. It is important, however, that the interior thereof, as, for example, a metal grommet or other metal retentive structure, be utilized so that the latter can be threaded onto bolt 31. Washers may also back the same as desired.

Washer 36' is disposed on the bolt 31 between the grommet 32 of wheel 33 and the compression-expandable resilient sleeve 38. Thus, in operation, when the tubular member 27 is slipped over compression-expandable resilient sleeve 38 so as to abut the metal grommet 39, for example, then the adjustment wheel 33 need only be threaded in the direction to the left so as to compress sleeve 38, expanding the same outwardly, so that the latter frictionally engaged the inner wall of tubular member 27. This provides a good, releasable, retentive securement between the aligned tubular members, i.e., coaxially-aligned members 27 and 28.

The manner in which the final securement takes is seen clearly in FIGURE 4, the wheel being threaded to the left as indicated to expand outwardly the resilient sleeve 38.

The structure seen in FIGURE 5 is substantially identical to that shown in FIGURES 3 and 4. However, in the case of the FIGURE 5 embodiment there is provided a saddle member 40 provided with a weather seal layer 41. Disposed against the weather seal 41 will be compression-expandable resilient sleeve 38' corresponding to sleeve 38 in FIGURE 3, the same being disposed adjacent bolt-head 31' of bolt 31. See also FIGURE 3. In forming the aperture A in tubular member 42, it is seen that an interior lip 43 is supplied. The rubber or Neoprene sleeve 38' will not only expand outwardly, so as to frictionally engage the interior surface of this lip 43 at S, but will also bulge outwardly at area B so as to come in an abutting contact with lip 43. In this manner retention is further aided in the cooperation between compression-expandable resilient sleeve 38' and the tubular member 42. The weather seal serves ideally to seat tubular member 42 and to provide a sealing engagement between the same and saddle member 40.

In operation, the sleeve 38' will be pre-loaded by the slight rotational displacement of wheel 33. Thereafter, the structure to the left of washer 37 is inserted into aperture A until the saddle member 40 with weather seal 41 abuts tubular member 42. At this juncture the adjustment wheel 33 is tightened so as to compress sleeve 38', causing the same to bulge outwardly and frictionally engage the inwardly-turned lip defining aperture A and to otherwise co-act therewith as shown at B. This provides a secure anchor for members which are to be transversed with respect to each other.

It is seen in the present invention that the invention is ideally suited for securing tubular elements together, which are either (1) coaxially aligned as shown in FIGURE 4, (2) transverse at a medial area of one tube; see FIGURE 5, or (3) secured together transversely at their extremities, see FIGURES 1 and 2.

FIGURE 6 illustrates in fragmentary view a structure alternate to that shown in the right-hand portion of FIGURE 5. Nut 34 and washer 34' are supplied as in the case of the structure of FIGURE 5. Included within tubular element or member 28 are a pair of washers 45 and 46 backing expandable resilient sleeve 48 the latter of which is made of rubber or Neoprene. Nut 47 is threaded onto bolt 31. In assembly the washer 29 need not be pre-affixed to tubular element 28.

In operation, and after assembly has been made as shown in FIGURE 6, sleeve 48 will be preloaded slightly and nut 34 tightened down and advanced to the left so as to compression-load and thus deform outwardly the resilient sleeve 48, this to friction-lock the illustrated structure within tubular element 28.

With reference to FIGURES 1 and 2 it will be observed that, if desired, a true, right exterior angle of the assembled structure may be had by simply making cap 11 flush with the exterior surface of boss 22 and tubular member 25.

It is noted that no tool (other than perhaps a screw driver or Allen wrench in the case of FIGURES 1 and 2) is required to assemble the tubular construction desired to be formed.

Figure 8:
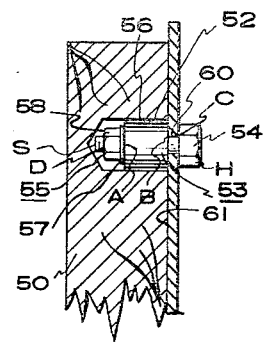
FIGURE 8 is an enlarged detail, principally in section, of the upper portion of the structure shown in FIGURE 7.
Figure 9:
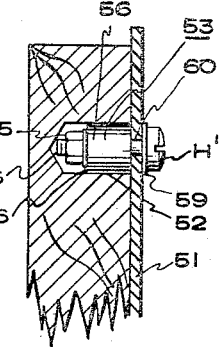
FIGURE 9 is a vertical section and is similar to FIGURE 8 excepting for the inclusion of a washer underneath the head element of the threaded member employed.

In FIGURE 7 an upstanding post 50 is provided with a sign 51 such as a stop sign or caution sign, for example. For convenience of illustration the post is cut away at A to indicate the manner in which sign 51 is secured to post 50. Post 50 is preliminarily provided with annular recesses 52 each of which is constructed to receive and retain each of the anchors 53. Each anchor, as shown in FIGURES 8 and 9, includes a threaded member 54 such as a bolt or screw, having head H and a threaded shank S, a retainer nut 55 threaded upon said shank S, and a resilient sleeve 56 made of rubber, Neoprene, or similar elastomer material. Retainer nut 55 preferably includes a bearing washer portion 57 which is integral with the remainder of the nut 58. In FIGURE 9 it is seen that a washer 59 may also be included in the construction to lower the friction retention of head H or H' with respect to the sign 51. It is seen that sign 51 includes aperture 60 for receiving the threaded members 54. Each of the anchor constructions at 53 may be substantially identical.

In practice the recesses 52 will be provided initially in post 50. The sign 51, during its fabrication process, will likewise be provided with apertures 60 as needed. Affixed to the sign, and perhaps in the shop, will be anchors 53 comprising the resilient sleeve 56, threaded member 54, and retainer nut 55. The anchor unit will be tightened down by a screwdriver or wrench, depending upon the head defiguration H, H', and the unit is then ready for installation upon post 50. It is important that the frictional retentive forces at junctures A and B be greater than the frictional forces present at junctures C and D, the latter being between the threads of threaded member 54 and retainer nut 55. In such a condition the head H or H' may be turned without chancing the turning either of retainer nut 55 or resilient sleeve 56 which presses against surface 61 of sign 51. Hence, the sign may be conveniently installed by inserting the anchors into their respective apertures 53, the user rotating the respective head H, H' of the anchor so that resilient sleeve 56 is compressed and swells outwardly to engage the wall of the respective apertures 52. The tighter the threaded member 54 is rotated, the tighter the compression fit of the anchor within its associated post aperture. It is noted that there need be no elongated bolts or other connections which are subject to rust and to excessive installation costs. When the sign is to be removed from the post there is needed merely the counter-rotation of the associated threaded member 54.

Figure 10:
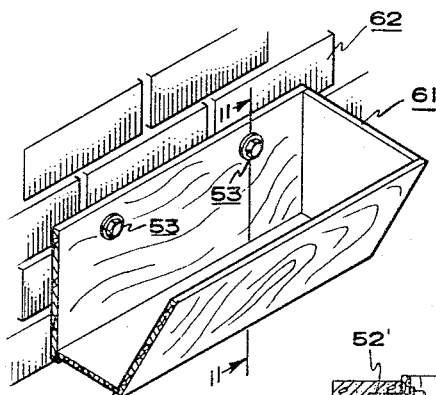
FIGURE 10 is a fragmentary perspective view of a planter box, the same showing the securement of a planter box to a masonry wall.
Figure 11:
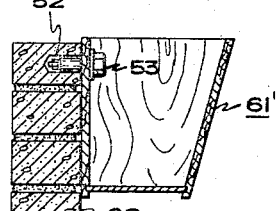
FIGURE 11 is a section taken along the line 11—11 in FIGURE 10.

FIGURES 10 and 11 illustrate the invention as to its application in securing a planter box, for example, to a masonry wall. The planter box is indicated at 61' and the masonry wall at 62. Anchors 53 and their securement within apertures 52' in the masonry wall correspond to the construction shown in FIGURE 7, for example.

Figure 12:
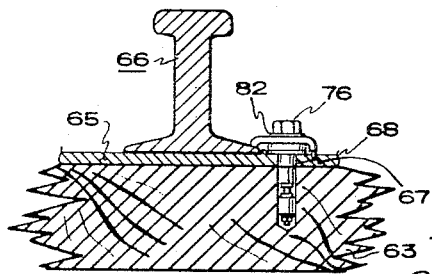
FIGURE 12 is a transverse section of a railroad tie, showing a manner in which it may be secured to the strap underneath and to the railroad tie supporting the same.
Figure 13:
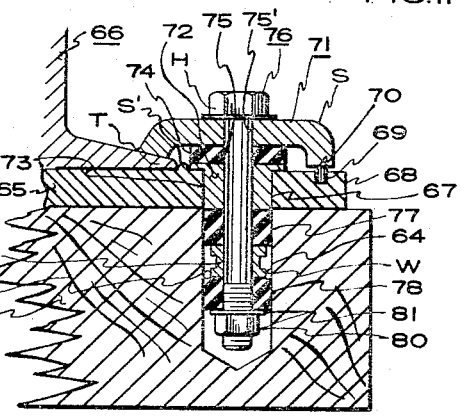
FIGURE 13 is an enlarged fragmentary detail, principally in section, of the structure of FIGURE 12 wherein the securement means is provided.

FIGURES 12 and 13 illustrate another use of the invention. In FIGURE 12 there is disclosed a railroad tie 63 provided with an anchor-accepting aperture 64 which corresponds to aperture 52 in FIGURE 7, for example. Strap 65 is disposed beneath the rail 66 and includes an aperture 67 and an outmost extremity 68 provided with a pin-type recess 69. Recess 69 is constructed for the reception of pin protuberance 70 which forms a part of bridge member 71. A plug insert 72 is inserted into aperture 73 of strap base 65. There is preferably included a resilient pad made of Neoprene, for example, and identified at 74. The same, as with bridge member 71, includes apertures 75 and 75'. Threaded member 76 corresponds to threaded member 54 in FIGURE 7, howbeit is somewhat longer. Disposed within tie aperture 64 are a pair of resilient sleeves 77 and 78 of corresponding dimension and character of resiliency. A spacer 79 is provided and preferably has an H-configured cross section. The outside circumference of spacer 79 at C' is preferably relieved from the wall W of aperture 64. Retainer nut 80 preferably includes a bearing washer 81 integral with the nut structure. The uppermost washer 82 is disposed between surface S of the bridge member 71 and head H of threaded member 76.

The structure shown in FIGURES 12 and 13 operates as follows. When a rail is installed it will be installed over a wood tie 63 which preferably includes a steel support strap 65. These two will be secured together in the usual manner as by screws, spikes, or other means. Or, such securement may indeed be provided through the attachment means shown in the drawings. In any event, the strap includes the aperture 73 and, preliminary to insertion of plug 72, the structure mounted upon threaded member 76 will be so positioned and the head H tightened down with respect to nut 80 so as to compress the resilient sleeves 77, 78 slightly. A slight protuberance of stop S' is provided to serve as a stop member for the toe T of rail 66. Bridge member 71 will have its respective ends engaging the rail and portion 68 of strap 65. In fact, the pin protrusion 70 will be disposed in aperture 69 of strap 65. Head H of threaded member 76 is tightened down by use of an appropriate wrench so as to compress the resilient sleeves 77, 78. The latter will in fact progress through the spacing between bushing 79 and wall W of the aperture so as to provide a pinch fit and rigid securement to the tie. It has been found through experimentation that two sleeves of moderate length operate much more satisfactorily than a single sleeve; furthermore, the spacing between the spacer 79 and the wall W of aperture 64 provides for an inward expression of the resilient sleeve when compressed so that a firm gripping of the wall aperture is achieved.

Such a fit may be provided on both sides of rail 66, albeit but one side is shown accommodated in the drawings. Resilient vibration pad 74 aids in avoiding loosening through vibration. And the over-all structure is readily adapted to aid ease of replacement without damage to the tie, and yet insures that rail securement will not be deleteriously affected through vibrations or other movements.

It will be understood that it is conceivable, however, to use a single resilient sleeve as shown in FIGURES 7-9.

Figure 14:
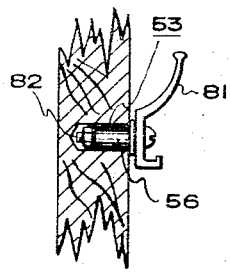
FIGURE 14 is a fragmentary side elevation of structure similar to that shown in FIGURE 7, but which illustrates that the structure of the invention may be used in connection with attaching a coat hook or any other object to a post or other support structure, and this is true whether or not the object includes an integral threaded member.

In FIGURE 14 there is seen a coat hook which includes an integral threaded member 82 passing through an anchor structure 53 which may be substantially identical to that shown in FIGURE 7. The provisional sleeve 56, and nut member 55 will be the same as previously. FIGURE 14 illustrates that a unit may be conveniently mounted to support structure in a manner that there is a blind hole provision incorporating the tightening structure. The tightening is done by simply revolving the external member, here support hook 81.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:
1. Structure for releasably joining together a pair of tubular members having mutually proximate, axially aligned openings, said structure comprising a plate immovably secured to one of said tubular members over its respective one of said openings, threaded means immovably associated with said plate, an elongate member threaded at one end and threadedly disposed in said threaded means and extending axially outwardly therefrom, said threaded member including as an outer unthreaded extremity, a reaction head at said outer extremity an elastomeric resilient sleeve snugly disposed upon said unthreaded extremity and abutting said reaction head, said resilient sleeve having an outer diameter greater than the diameter of said reaction head, the remaining one of said tubular members having a continuous abutment surface co-axial with and circumscribing said opening associated therewith, washer means mounted over said threaded member adjacent that end of said resilient sleeve which is remote from said reaction head, and freely rotatable, thumb-and-finger actuated means mounted upon and threadedly engaging said threaded member intermediate the ends thereof and disposed between said washer means and said plate, means on said threaded member exterior of said plate to lock said threaded member and said plate against all relative movement whereby when said resilient sleeve is disposed through said opening proximate said continuous surface, said rotatable means and said washer means, when the former is threaded toward the latter, thrust against said resilient sleeve, compressing the latter to expand it outwardly and to frictionally engage said continuous surface, to thereby friction-lock said tubular members together.

2. Structure according to claim 1 wherein saddle means is disposed between said washer and said resilient sleeve for covering that one of said openings through which said resilient sleeve is placed.

References Cited

UNITED STATES PATENTS

| | | | |
|---|---|---|---|
| 922,544 | 5/1909 | Turner et al. | 285—338 X |
| 1,030,306 | 6/1912 | Hull | 285—193 X |
| 1,811,042 | 6/1931 | Desmond | 285—197 X |
| 2,356,199 | 8/1944 | Battlermann | 287—2 |
| 2,390,168 | 12/1945 | Piot. | |
| 2,456,480 | 12/1948 | Austin | 287—126 X |
| 2,520,375 | 8/1950 | Roe | 85—69 |
| 2,721,089 | 10/1955 | Shames | 285—338 |
| 3,004,743 | 10/1961 | Wenger | 287—58 |

FOREIGN PATENTS

| | | |
|---|---|---|
| 1,312,011 | 11/1962 | France. |

CARL W. TOMLIN, *Primary Examiner.*

W. L. SHEDD, T. A. LISLE, *Assistant Examiners.*